J. A. PATTERSON AND E. J. MILLER.
CONNECTING ROD.
APPLICATION FILED AUG. 15, 1921.

1,434,143. Patented Oct. 31, 1922.

J. A. Patterson & E. J. Miller,
INVENTOR.

BY Geo. P. Kimmel,
ATTORNEY.

Patented Oct. 31, 1922.

1,434,143

UNITED STATES PATENT OFFICE.

JOSEPH ARTHUR PATTERSON AND EDWARD JOSEPH MILLER, OF WAYNESBURG, PENNSYLVANIA.

CONNECTING ROD.

Application filed August 15, 1921. Serial No. 492,506.

*To all whom it may concern:*

Be it known that we, JOSEPH ARTHUR PATTERSON and EDWARD JOSEPH MILLER, citizens of the United States, residing at Waynesburg, in the county of Greene and State of Pennsylvania, have invented certain new and useful Improvements in Connecting Rods, of which the following is a specification.

This invention relates to automobile connecting rods and more particularly to a novel and improved construction permitting removal and replacement of worn bearings without necessitating a new rod.

The primary object of the invention is to produce a connecting rod wherein the shaft and bearings associated therewith may be easily and conveniently removed and replaced, including provision for tightening the bearings in position on a shaft.

Another object of the invention resides in a new and improved connecting rod affording a more convenient and positive clamping connection with a cross head pin and wrist pin, yet permitting its easy removal when so desired.

Another and still very important object of the invention is the provision of a connecting rod designed for use in connection with practically any type of motor and particularly adapted for use in automobile constructions, and one in which the parts are extremely simple in construction, easily assembled, rigid and durable, highly efficient in operation, practical and capable of being manufactured at a very low cost whereby its commercial possibilities are greatly enhanced.

The invention will be best understood from a consideration of the following detailed description.

We attain these objects in the accompanying drawings, wherein:—

Figure 1:
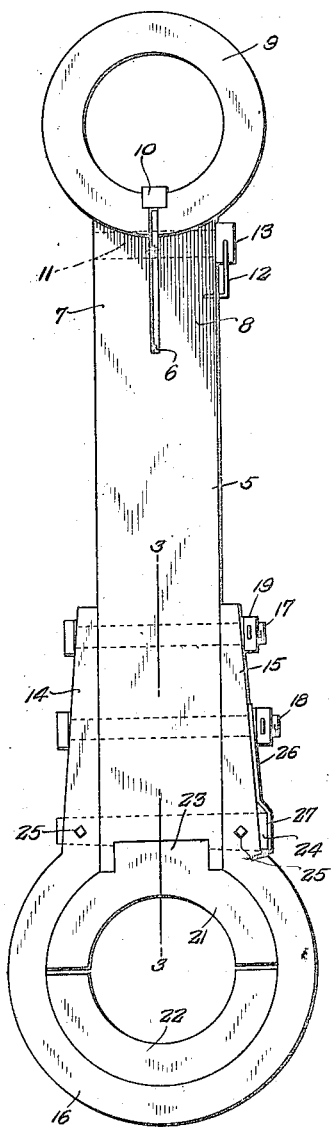
Figure 1 is a front view.
Figure 3:
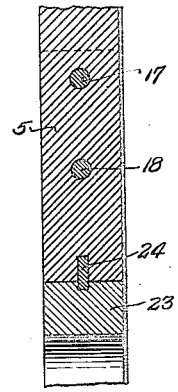
Figure 3 is a sectional view taken on the line 3—3 of Figure 1.
Figure 4:
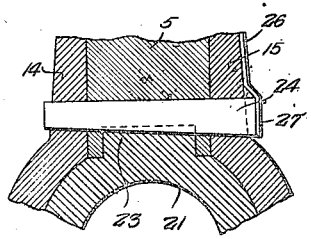
Figure 4 is an enlarged sectional detail showing the locking key in position.
Figure 2:
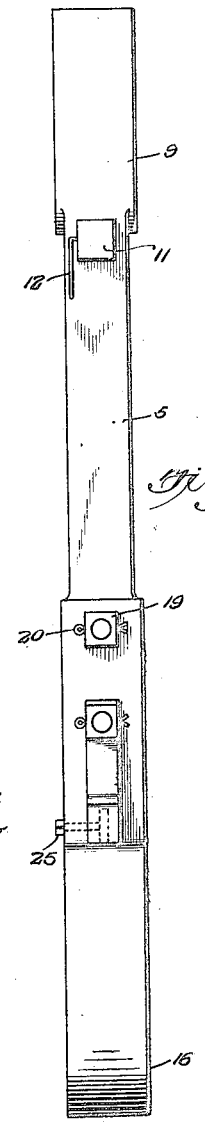
Figure 2 is a side view.

Referring now to the drawings wherein like parts designate corresponding parts throughout the several views, 5 designates the main body portion or shank of the connecting rod which is provided with a vertical slit 6 in the upper end and medially thereof dividing the rod into two, similar arms 7, 8. The said arms have formed therewith a divided wrist pin bearing 9, said bearing being adapted to receive the square cross head pin 10 usually held in locking engagement in a groove formed in the said wrist pin (not shown).

A transversely extending threaded bolt 11 passes through an aperture in the respective arms 7, 8 beneath the cross head pin so that when the bolt is tightened the divided wrist pin bearing will clamp the cross head pin and be thus securely connected to the wrist pin. Any suitable fastening element such as a bent wire or resilient rod 10 may be passed through the end 13 of the bolt and be secured in a slot or recess in the arm 8 to thus prevent the turning of the bolt when in its locked position. The connecting rod 5, which as shown is rectangular in cross section although it may be tapered if so desired, has connected thereto a bearing holder, the tapered sides 14, 15 of which are formed integral with a shaft bearing support 16. The tapered sides of the bearing holder overlie the flat sides of the connecting rod and are adapted to be secured thereto by threaded bolts 17, 18, passing through the same and the connecting rod, lock nuts 19 and cotter pins 20 being provided on the ends of said bolts for preventing the turning thereof.

The upper and lower sections 21, 22 of the sectional shaft bearing are securely held by the bearing support 16 above referred to, the upper section 21 having a grooved polygonal shaped extension 23 inter-fitting with the lower end of the connecting rod and held in locking engagement therewith by a transversely extending wedge key 24, passing through the groove of the extension 23. The groove in the extension 23, is arranged at the upper end thereof, and has its bottom inclining throughout. A pair of set screws 25 passing through the tapered sides 14, 15 and at right angles thereto are adapted to retain the key in its locked position, but in addition we have provided an auxiliary resilient protector 26 held by the bolt 18, the bent end 27 of said protector overlying and engaging the outer end of the wedge key and preventing the removal thereof should one of the set screws become loose.

By reason of this construction it will be readily seen that should the bearings become worn so that it is necessary to replace the same, by simply removing the support 16 from the connecting rod 5 said bearings may be easily replaced, thus dispensing with the necessity of a new connecting rod as required by the practice heretofore. Of course in most instances where it is only necessary to replace either the lower or upper section of the bearing by removing the set screws 25 and tapping the wedge with a hammer, the same may be removed and the sections of the bearing replaced after which the wedge key may be again inserted to lock the bearing with the connecting rod.

In the accompanying drawings, we have illustrated our invention embodied in one form by way of example, which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described our invention what we now claim as new and desire to secure by Letters Patent of the U. S. is:—

1. A connecting rod of the class described comprising a shank, a bearing support secured to the sides of the shank, a sectional bearing carried by said support, the upper section of said bearing abutting against and having an extension interfitting within the end of said shank, and means cooperating with said extension for locking said upper section of said bearing with the end of the shank.

2. A connecting rod of the class described comprising a shank, a bearing support having arms attached to the sides of the shank, a sectional bearing carried by said support, the upper section of said bearing having a grooved polygonal extension inter-fitting with the end of said shank, and a wedge extending through the groove of said extension for locking said upper section of the bearing with the end of the shank.

3. A connecting rod of the class described comprising a shank, a bearing support having tapered arms engaging each side of the shank, fastening elements passing through the tapered arms and the shank, a sectional bearing abutting against and having an extension carried by said support, the upper section of said bearing inter-fitting within the end of the shank, a wedge passing through said arms and extension for locking the upper section of the bearing with said end of the shank, and set screws carried by said arms and engaging one side of said wedge for retaining it in locked position.

4. A connecting rod of the class described comprising a shank, a bearing support having tapered arms engaging each side of the shank, fastening elements passing through the said arms and the shank, a sectional bearing carried by said support, the upper section of said bearing interfitting with the end of the shank, a wedge passing through the arms for locking the upper section of the bearing with the end of the shank, set screws for retaining said wedge in its locked position, and an auxiliary protector connected to one of the fastening elements and engaging one end of the wedge for preventing lateral movement thereof.

5. A connecting rod of the class described comprising a shank, the upper end of said shank being split and having integral with the split portions thereof a split wrist pin bearing, a cross head pin held in clamping engagement with the split ends of said bearing, a screw threaded element passing through the split portion of the shank, an angle shaped fastening element having one end extended into the head of said element and its other end extended into said shank for preventing turning movement of the said fastening element when in its locked position.

In testimony whereof, we affix our signatures hereto.

JOSEPH ARTHUR PATTERSON.
EDWARD JOSEPH MILLER.